US008593922B2

(12) United States Patent
Kosaka

(10) Patent No.: US 8,593,922 B2
(45) Date of Patent: Nov. 26, 2013

(54) OPTICAL DISC APPARATUS, FOCUS CONTROL METHOD AND CONTROL PROGRAM

(75) Inventor: Kaoru Kosaka, Hachiouji (JP)

(73) Assignee: J&K Car Electronics Corporation, Hachiouji-Shi, Tokyo-To (JP)

( * ) Notice: Subject to any disclaimer, the term of this patent is extended or adjusted under 35 U.S.C. 154(b) by 130 days.

(21) Appl. No.: 13/243,157

(22) Filed: Sep. 23, 2011

(65) Prior Publication Data

US 2012/0075973 A1   Mar. 29, 2012

(30) Foreign Application Priority Data

Sep. 24, 2010   (JP) ................................ 2010-213076

(51) Int. Cl.
*G11B 7/00* (2006.01)
(52) U.S. Cl.
USPC ....................................................... 369/53.23
(58) Field of Classification Search
None
See application file for complete search history.

(56) References Cited

U.S. PATENT DOCUMENTS

| 6,392,965 | B1 | 5/2002 | Ueyama |
| 8,077,581 | B2 * | 12/2011 | Shinoda .................. 369/112.01 |
| 2008/0298181 | A1 | 12/2008 | Ueno et al. |
| 2010/0014397 | A1 * | 1/2010 | Hoshino et al. ............ 369/47.15 |

* cited by examiner

*Primary Examiner* — Joseph Feild
*Assistant Examiner* — Parul Gupta
(74) *Attorney, Agent, or Firm* — Renner, Kenner, Greive, Bobak, Taylor & Weber

(57) ABSTRACT

Focus control is performed for an optical disc having at least two data layers. One data layer is located closer than the other to a beam-incident surface of the disc. Maximum levels in positive and negative sides on a characteristic curve of a focus error signal obtained from the disc are obtained for both data layers. First and second focus balance values are obtained based on the maximum levels for the data layers, respectively. It is determined whether a difference between the first and second focus balance values satisfies at least either a first requirement or a second requirement. The first requirement requires that the difference exceed a predetermined threshold value. The second requirement requires that the second focus balance value be smaller than a predetermined threshold value. A focus balance value is selected depending on a result of the determination, for focus control.

12 Claims, 6 Drawing Sheets

OPTICAL DISC APPARATUS, FOCUS CONTROL METHOD AND CONTROL PROGRAM

CROSS-REFERENCE TO RELATED APPLICATIONS

This application is based on and claims the benefit of priority from the prior Japanese Patent Application No. 2010-213076 filed on Sep. 24, 2010, the entire content of which is incorporated herein by reference.

BACKGROUND OF THE INVENTION

The present invention relates to an optical disc apparatus, a focus control method, and a control program capable of high-quality reproduction of an optical disc having at least two data layers.

Optical discs for which a laser beam is used in recording/reproduction have been in wide use as a storage medium for audio data, video data, and other several types of digital data. Representative of optical discs are CD (Compact Disc), DVD (Digital Versatile Disc), BD (Blu-ray Disc), etc. Moreover, representative of data-writable optical discs are CD-R, CD-RW, DVD-R, DVD-RW, BD-RE, etc. Among these discs, there are optical discs having several data layers for larger storage capacity. A representative of such optical disc is DVD-DL (Digital Versatile Disc Dual Layer) having two data layers on one side.

When an optical disc is set in an optical disc apparatus, usually, a laser beam is directed onto the optical disc while the focal point is being shifted from the surface side (a laser side) to the far side of the optical disc. The shift of focal point is perform to acquire a characteristic curve of a FE (Focus Error) signal (a focus-error signal curve, referred to as a FES curve, hereinafter) of the optical disc, for discriminating the type of the disc, obtaining the in-focus point, etc.

FIG. 1 shows a FES curve for a regular single-sided dual-layer DVD having data layers separated from each other with an enough distance. For such a single-sided dual-layer DVD, there are two FES curve portions. One FES curve portion corresponds to a layer L0 that is a first data layer on the surface side. The other FES curve portion corresponds to a layer L1 that is a second data layer on the far side. The FES curve portions are connected to form a FES curve. With such a FES curve shown in FIG. 1, several types of control, such as focus control, can be performed with regular procedures.

Most regular optical discs available on the market have a standard distance between layers L0 and L1, the value of the distance being almost the center of a standard range. Not only that, there are dual-layer DVDs having layers L0 and L1 with a smaller distance therebetween than the regular optical discs. Such dual-layer DVDs having closer layers L0 and L1 could exhibit a FES curve, such as shown in FIG. 4 (which will be explained later), with low FE signal levels between the layers L0 and L1. This is caused by overlapping of reflected beams from adjacent layers. With such a FES curve, normal data reproduction may not be performed due to focus error on the layer L1 that is the second data layer.

In order to solve the problem, U.S. Pat. No. 6,392,965 discloses an invention related to an optical pickup device for achieving accurate focus control of an optical disc with close data layers by having main photoreceptive domains and auxiliary photoreceptive domains for mitigating the effect of reflected beams from the close data layers.

However, the invention disclosed in U.S. Pat. No. 6,392,965 has a problem of a higher cost due to increase in the number of divided photoreceptive domains, or cell numbers.

SUMMARY OF THE INVENTION

A purpose of the present invention is to provide an optical disc apparatus, a focus control method, and a control program capable of high-quality reproduction of an optical disc having close data layers even with a low-priced pickup device.

The present invention provides an optical disc apparatus comprising: an optical pickup device configured to detect a value of a return beam reflected by an optical disc and to output the detected value; a controller configured to focus control based on the detected value; and a discriminator configured, when the optical disc has at least a first data layer and a second data layer on which data is recorded or from which data is reproduced, the first data layer being located closer than the second data layer to a beam-incident surface of the optical disc, to obtain a maximum level in a positive side and a maximum level in a negative side on a characteristic curve of a focus error signal obtained from the optical disc, for both of the first and second data layers, to obtain a first focus balance value based on the maximum levels in the positive and negative sides for the first data layer and a second focus balance value based on the maximum levels in the positive and negative sides for the second data layer, and to determine whether a difference between the first and second focus balance values satisfies at least either a first requirement or a second requirement, the first requirement requiring that the difference exceed a predetermined threshold value and the second requirement requiring that the second focus balance value be smaller than a predetermined threshold value, wherein the controller selects a focus balance value depending on a result of the determination concerning the difference between the first and second focus balance values, for focus control.

Moreover, the present invention provides a focus control method for an optical disc having at least a first data layer and a second data layer on which data is recorded or from which data is reproduced, the first data layer being located closer than the second data layer to a beam-incident surface of the optical disc, the method comprising the steps of: obtaining a maximum level in a positive side and a maximum level in a negative side on a characteristic curve of a focus error signal obtained from the optical disc, for both of the first and second data layers; obtaining a first focus balance value based on the maximum levels in the positive and negative sides for the first data layer and a second focus balance value based on the maximum levels in the positive and negative sides for the second data layer; determining whether a difference between the first and second focus balance values satisfies at least either a first requirement or a second requirement, the first requirement requiring that the difference exceed a predetermined threshold value and the second requirement requiring that the second focus balance value be smaller than a predetermined threshold value; and selecting a focus balance value depending on a result of the determining step, for focus control.

Furthermore, the present invention provides a control program running on a computer for focus control of an optical disc having at least a first data layer and a second data layer on which data is recorded or from which data is reproduced, the first data layer being located closer than the second data layer to a beam-incident surface of the optical disc, the program comprising: a program code of obtaining a maximum level in a positive side and a maximum level in a negative side on a characteristic curve of a focus error signal obtained from the optical disc, for both of the first and second data layers; a program code of obtaining a first focus balance value based on the maximum levels in the positive and negative sides for the first data layer and a second focus balance value based on the maximum levels in the positive and negative sides for the second data layer; a program code of determining whether a difference between the first and second focus balance values satisfies at least either a first requirement or a second requirement, the first requirement requiring that the difference exceed a predetermined threshold value and the second requirement requiring that the second focus balance value be smaller than a predetermined threshold value; and a program code of selecting a focus balance value depending on a result of the determining step, for focus control.

DETAILED DESCRIPTION OF PREFERRED EMBODIMENTS

Embodiments of an optical disc apparatus, a focus control method, and a control program according the present invention will be explained with reference to the attached drawings.

Figure 1:
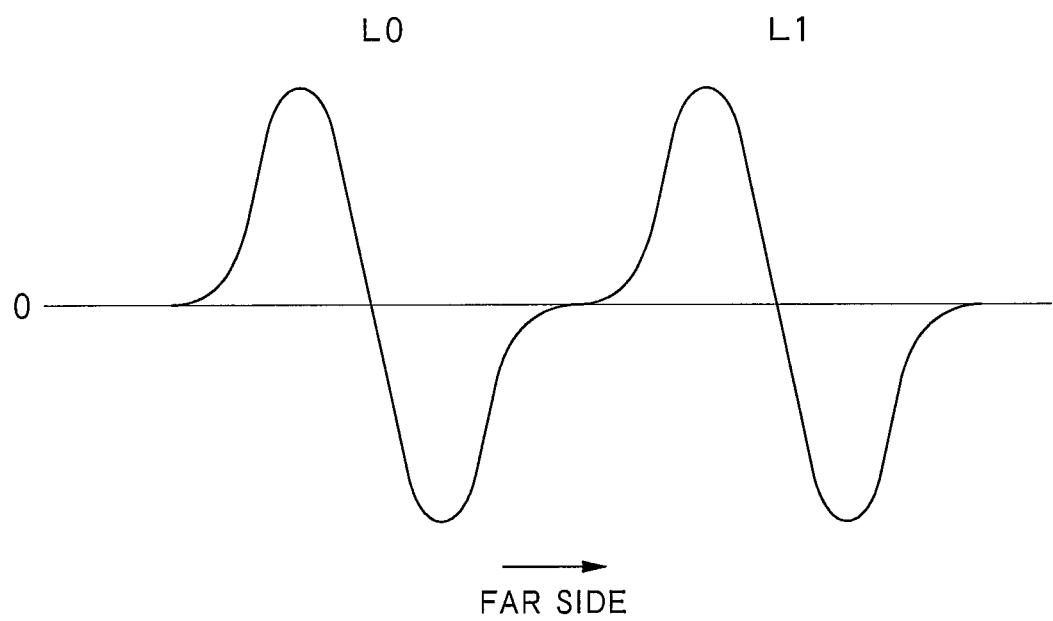
FIG. 1 shows a FES curve for a regular dual-layer DVD.
Figure 2:
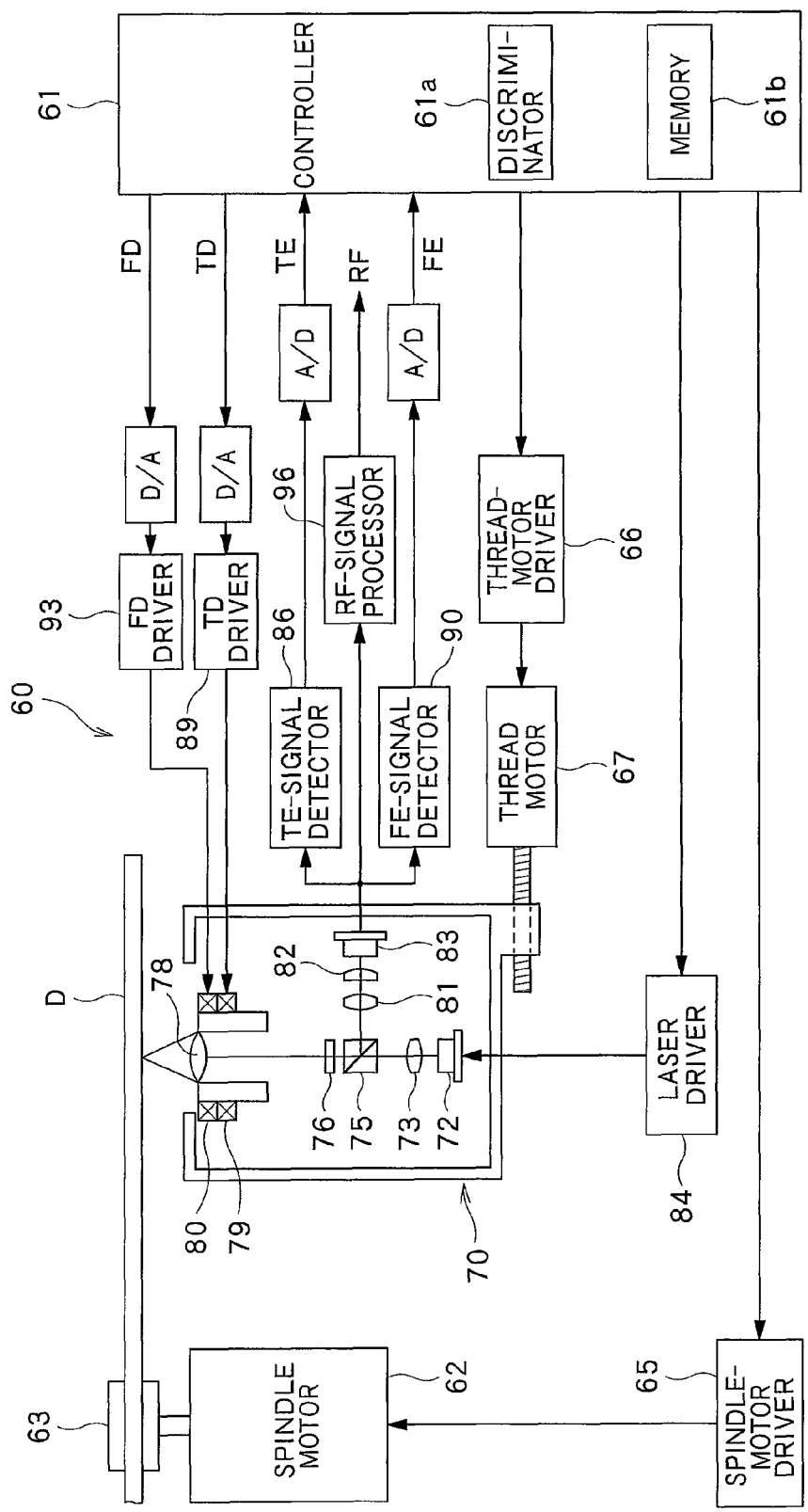
FIG. 2 is a block diagram schematically showing the configuration of an optical disc apparatus according to the present invention.

Explained first is an operation of an optical disc apparatus 60 according to the present invention. FIG. 2 is a block diagram schematically showing the configuration of the optical disc apparatus 60. No detailed explanation is given to the elements of FIG. 2, such as an A/D converter, which are not directly related to the present invention.

The optical disc apparatus 60 is equipped with a turntable 63 to detachably clamp an optical disc D placed thereon. The turntable 63 is fixed to the rotation shaft of a spindle motor 62. The spindle motor 62 rotates at a specific rotating speed with an instruction from a controller 61 via a spindle-motor driver 65. When the spindle motor 62 rotates, the optical disc D placed on the turntable 63 also rotates at the specific rotating speed.

Provided under the optical disc D is an optical pickup device 70 connected to a sled motor 67. The controller 61 controls the rotation of the sled motor 67 so that the optical pickup device 70 moves in the radius direction of the optical disc D.

The optical pickup device 70 is equipped with a laser source 72 suitable for the optical disc D. The optical pickup device 70 may be equipped with several laser sources 72 for several types of optical discs D. The controller 61 sends a drive instruction to the laser source 72 via a laser driver 84 so that the laser source 72 emits a laser beam having a specific wavelength. The emitted laser beam is converted into parallel beams via a collimator lens 73. The parallel beams pass through a beam splitter 75 and are then converted into circularly polarized beams by a λ/4 plate 76. The circularly polarized beams are converged and irradiated onto a data layer of the optical disc D via an objective lens 78.

The irradiated laser beam is reflected by the data layer and reaches the beam splitter 75 as a return beam via the objective lens 78 and the λ/4 plate 76. The return beam is then reflected by the beam splitter 75 and enters a multi-segment photodetector 83 via a detection lens 81 and a cylindrical lens 82.

The multi-segment photodetector 83 has a plurality of photoreceptive regions for detecting a return beam. A detected value output by the multi-segment photodetector 83 is output to a TE (tracking error)-signal detector 86 for tracking control, a FE-signal detector 90 for focus control, and a RF-signal processor 96.

The TE-signal detector 86 performs specific computation to the detected value of the multi-segment photodetector 83 based on known DPD (Differential Phase Detection) to output a tracking error signal TE that is output to the controller 61 via an A/D converter.

The controller 61 generates a tracking-control drive signal TD based on the tracking error signal TE and outputs the drive signal TD to a tracking (TD) driver 89 via a D/A converter. The TD driver 89 controls a tracking coil 79 based on the tracking-control drive signal TD so that the objective lens 78 moves for tracking control of the optical disc D.

In addition, the FE-signal detector 90 receives the output signal of the multi-segment photodetector 83 and performs specific computation based on known astigmatic focus-error detection to output a focus error signal FE to the controller 61 via an A/D converter.

The controller 61 generates a focus-control drive signal FD based on the focus error signal FE that is output to a focus (FD) driver 93 via a D/A converter. The FD driver 93 controls a focus coil 80 based on the focus-control drive signal FD so that the objective lens 78 moves (a focusing operation) for focus control of the optical disc D.

The focus control requires focus balance values obtained based on a FES curve for high reproduction quality. When the optical disc D is detected as an optical disc having close two data layers, as described later, a previously set focus balance value is used for the second data layer L1 at the far side. The focus balance value is known from U.S. Patent Publication No. 2008/0298181.

The RF-signal processor 96 receives the output signal of the multi-segment photodetector 83 to obtain a main-data signal RF (a RF signal) stored in the data layer of the optical disc D with known processing. The main-data signal RF is output to a reproduction apparatus (not shown) and output therefrom as a video or audio signal.

In FIG. 2, the controller 61 is provided with a discriminator 61a for distinguishing the type of the optical disc D set on the turntable 63 and a memory 61b for storing focus balance values and other values to be used when the optical disc D has close data layers. The discriminator 61a and the memory 61b may be provided separately from the controller 61.

Here, the structure and type of the optical disc D are defined as follows in the present invention.

The optical disc D has at least two layers L0 and L1 on which data is recorded or from which data is reproduced. The layer L0 is a first data layer located closer to a beam-incident surface of the optical disc D. The layer L1 is a second data layer located distant from the beam-incident surface of the optical disc D. That is, the first data layer is located closer than the second data layer to the beam-incident surface of the optical disc D.

The optical disc D is categorized into two types. A first type is a regular dual-layer optical disc (or DVD) having at least two data layers, the distance between the data layers being almost the center of a standard range. A second type is a dual-layer optical disc (or DVD) having at least two data layers, the distance between the data layers being smaller than the first type. The first type is referred to as a regular dual-layer DVD having distant data layers, hereinafter. The second type is referred to as a dual-layer DVD having close data layers, hereinafter.

When the optical disc D is set on the turntable 63, the discriminator discriminates between the regular dual-layer DVD having distant data layers and the dual-layer DVD having close data layers. And, when the optical disc D is determined as the dual-layer DVD having close data layers, focus balance values and other values are retrieved from the memory 61b for several types of control of the optical disc D having close data layers.

In this embodiment, the known DPD is used for tracking control. Another known technique that can be used in the embodiment is DPP ((Differential Push Pull) with return beams. In the known DPP, a laser beam is separated into a main beam and two sub-beams, and the two sub-beams are used as the return beams.

The operation of an optical disc apparatus, a focus control method, and a control program according to the present invention will be explained next with respect to a flowchart of FIG. 3.

The control program in this embodiment corresponds to the controller 61 and the discriminator 61a of FIG. 2, that are configured with a computer. Moreover, although the explanation is made with a dual-layer DVD, it is applicable to any type pf optical disc having a plurality of data layers.

Firstly, an optical disc D is placed on the turntable 63 of the optical disc apparatus 60 according to a specific procedure, which initiates a start-up process to the optical disc D (step S100).

When the start-up process starts, the controller 61 performs a control procedure to rotate the optical disc D and emit a laser beam onto the optical disc D to determine the type of the optical disc with a known optical-disc discrimination procedure (step S102).

If the optical disc D is determined as any type except for a dual-layer DVD (NO in step S102), the succeeding steps for the determined type are performed (step S200).

On the other hand, if the optical disc D is determined as a dual-layer DVD (YES in step S102), the discriminator 61a of the controller 61 obtains a FES curve for the optical disc D (step S104). If a FES curve has already been obtained through the optical-disc discrimination procedure in step S102, this FES curve is used.

Figure 4:
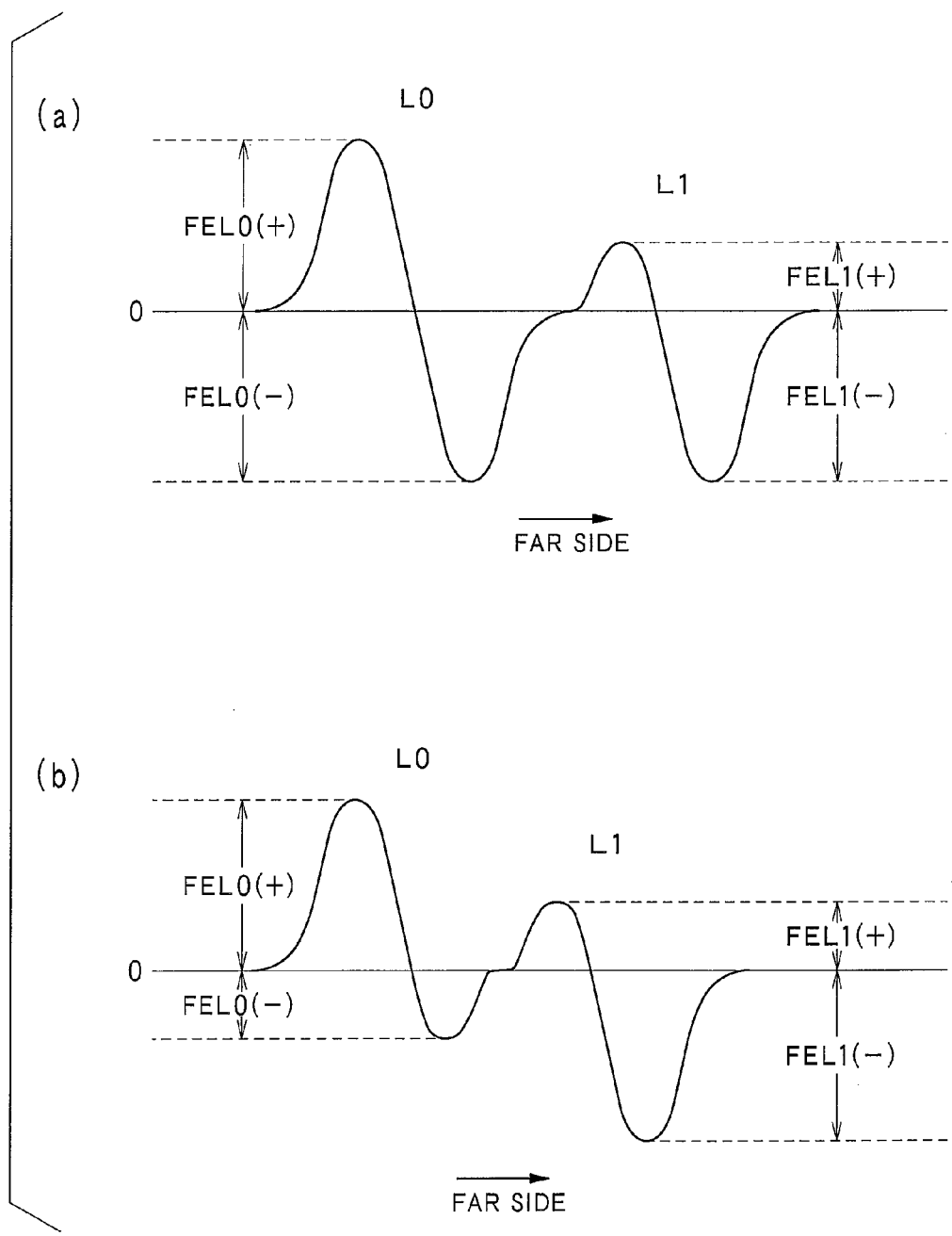
FIG. 4 is a view showing examples of FES curves for a dual-layer optical disc D having close data layers.

Shown in (a) and (b) of FIG. 4 are examples of FES curves for dual-layer optical DVDs having closer data layers than regular optical discs available on the market. Regular optical discs have data layers with an average distance therebetween that are dual-layer optical DVDs having distant data layers, according to the definition in the present invention.

As shown in FIG. 4, FES curves for dual-layer DVDs having close data layers have curve portions of different levels between the layer L0 (the first data layer) and the layer L1 (the second data layer). In detail, shown in (a) FIG. 4 is that the layer L1 exhibits a low level in the positive side. Shown in (b) FIG. 4 is that the layer L0 exhibits a low level in the negative side and the layer L1 exhibits a low level in the positive side.

With such FES curves shown in FIG. 4, correct focus control cannot be performed particularly to the layer L1.

In order to solve the problem discussed above, in FIG. 3, when the FES curve is obtained in step S104, the discriminator 61a discriminates between a dual-layer DVD having close data layers and that having distant data layers for the optical disc D placed on the turntable 63. In order to make discrimination, the discriminator 61a obtains several levels of the FES curve (step S106), as follows: the maximum level FEL0(+) in the positive side and the maximum FEL0(−) in the negative side for the layer L0 and the maximum level FEL1(+) in the positive side and the maximum FEL1(−) in the negative side for the layer L1.

Next, the discriminator 61a determines whether the obtained levels satisfy at least either a first or a second requirement which will be explained later (step S108).

The optical disc D is determined as a dual-layer DVD having close data layers if either the first or second requirement is satisfied or both requirements are satisfied. Moreover, it is more preferable to add a third requirement which will also be explained later for more accurate determination of disc type. In this case, the optical disc D is determined as a dual-layer DVD having close data layers if the first and third requirements, the second and third requirements, or the first, second and third requirements are satisfied.

The first requirement is explained first. Curve balance values SBAL(L0) and SBAL(L1) for the layers L0 and L1, respectively, are calculated as follows.

$$SBAL(L0)=(FEL0(+)-FEL0(-))/(FEL0(+)+FEL0(-))\times 100(\%)$$

$$SBAL(L1)=(FEL1(+)-FEL1(-))/(FEL1(+)+FEL1(-))\times 100(\%)$$

If the difference between the balance values SBAL(L0) and SBAL(L1) exceeds a predetermined threshold value A (SBAL(L0)-SBAL(L1)>A), the optical disc D is determined as a dual-layer DVD having close data layers. This is the first requirement. The threshold value A is preferably in the range from 30% to 40%. In this range, 32% is the most recommended value for the threshold value A.

The first requirement is provided for a dual-layer DVD having close data layers that exhibits a big difference between the curve balance values SBAL(L0) and SBAL(L1).

The range and recommended value described above for the threshold value A are just an example and are decided according to the actual distance between the layers L0 and L1 of a dual-layer DVD. This is also true for threshold values B and C which will be explained later.

Explained next is the second requirement. If the balance value SBAL(L1) is smaller than a predetermined threshold value B (SBAL(L1)<B), the optical disc D is determined as a dual-layer DVD having close data layers. This is the second requirement. The threshold value B is preferably in the range from −20% to −30%. In this range, −23% is the most recommended value for the threshold value B.

The second requirement is provided for a dual-layer DVD having close data layers that exhibits a large curve balance value SBAL(L1) in the negative side, especially, for the layer L1.

Explained next is the third requirement. If the ratio of the maximum level FEL0(+) for the layer L0 to the maximum level FEL1(+) for the layer L1 exceeds a predetermined threshold value C (FEL0(+)/FEL1(+)>C), the optical disc D is determined as a dual-layer DVD having close data layers. This is the third requirement. The threshold value C is preferably in the range from 200% to 300%. In this range, 250% is the most recommended value for the threshold value C.

The third requirement is provided for a dual-layer DVD having close data layers that exhibits a low level of FEL1(+), hence the ratio of FEL0(+) to FEL1(+) becomes very high.

Nevertheless, there are optical discs D, available on the market, that exhibit higher reflectance on the layer L0 than on the layer L1. There is a possibility that this type of optical disc D satisfies the third requirement irrespective of the distance between the layers L0 and L1. Therefore, it is preferable that the third requirement is combined with either the first or second embodiment, or with both requirements for determining the type of optical discs D.

Figure 3:
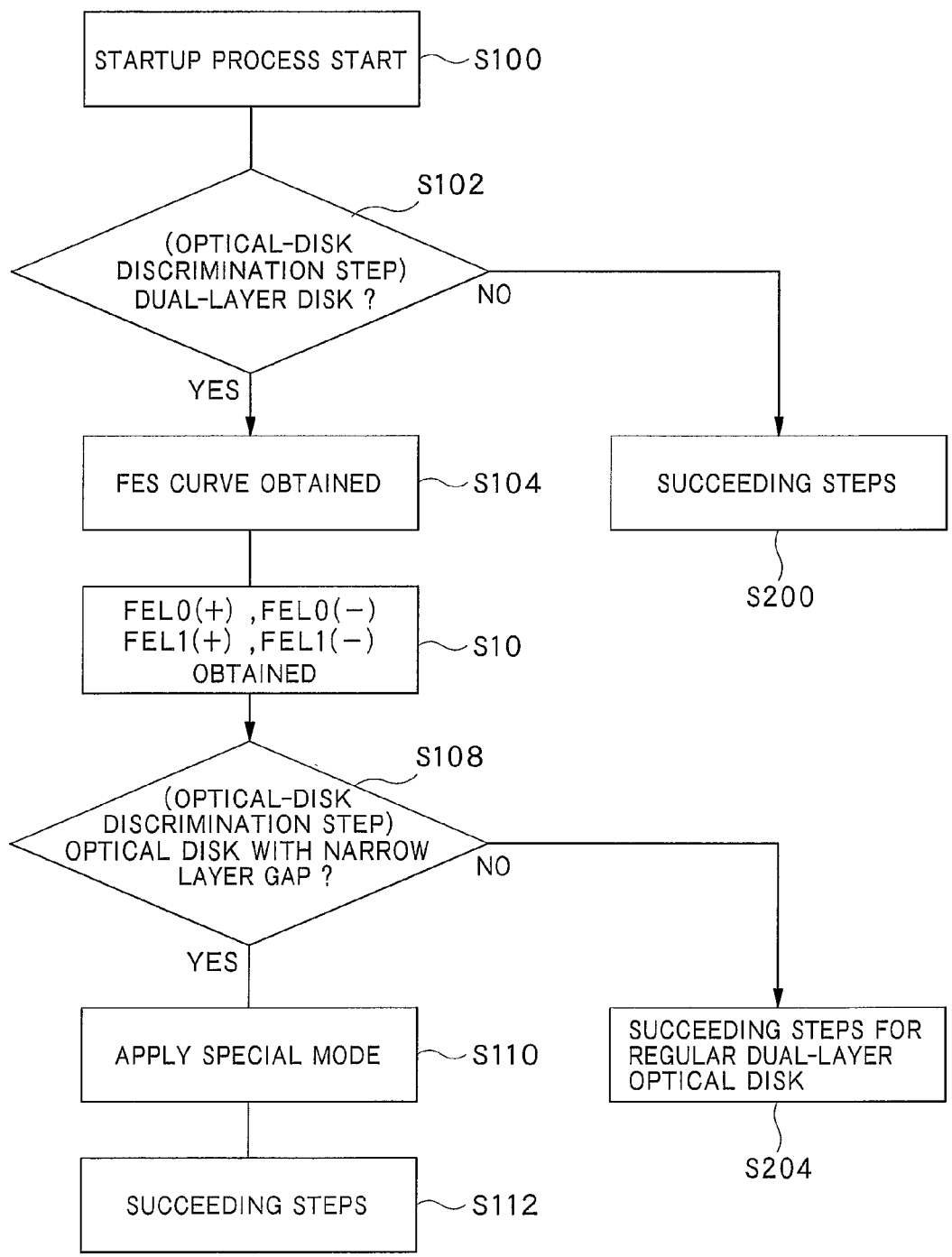
FIG. 3 is a flow chart explaining an operation of an optical disc apparatus, a focus control method, and a control program according to the present invention.

If it is determined in step S108 of FIG. 3 that the optical disc D is the type having close data layers, the operating mode is switched to a special mode (step S110), followed by the succeeding steps S112 including focus control in reproduction of the optical disc D in the special mode.

On the other hand, if it is determined in step S108 that the optical disc D is not the type having close data layers, the process moves to step S204 for the succeeding steps for a regular dual-layer DVD.

Explained next in detail is the focus control in the special mode performed in step S110.

In the special mode of step S110, the controller 61 uses a focus balance value previously stored in its memory 61b for the focus control of the layer L1 in the far side. In detail, if it is determined by the discriminator 61a that the optical disc D is the type having close data layers, the controller 61 uses a focus balance value stored in the memory 61b. On the other hand, if it is determined by the discriminator 61a that the optical disc D is a regular dual-layer DVD, the controller 61 uses a focus balance value obtain by a known technique.

A dual-layer DVD having close data layers, that exhibits a FES curve such as shown in (a) of FIG. 4, exhibits a very low level of FEL1(+) at the layer L1. For such a dual-layer DVD, an appropriate focus balance value cannot be obtained with regular focus adjustments, which may result in problems in a reproduction start-up process with defocusing.

Figure 5:
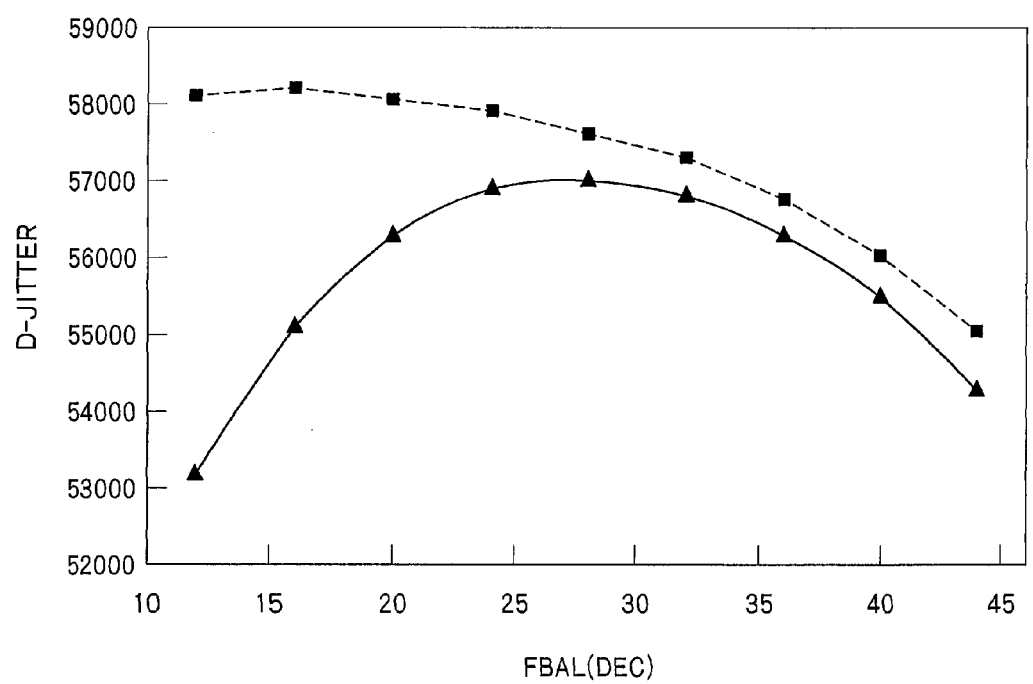
FIG. 5 is a graph showing the relationship between a focus balance value and a digital jitter for a dual-layer optical disc having close data layers.

FIG. 5 shows the relationship between the focus balance value and digital jitter for the layer L1. The digital jitter indicates the reproduction quality of RF signals with numerical values, relating to jitters. A larger digital jitter value indicates higher reproduction quality.

A solid-line curve in FIG. 5 shows the change in digital jitter for the layer L1 of a dual-layer DVD having close data layers. In contrast, a broken-line curve in FIG. 5 shows the change in digital jitter for the layer L1 of a dual-layer DVD having distant data layers.

As shown in FIG. 5, a dual-layer DVD having distant data layers exhibits a moderate decrease in digital jitter to the change in focus balance value. Especially, at a focus balance closer to zero, the digital jitter is roughly constant. The broken-line curve in FIG. 5 teaches that it is possible to reproduce data from the layer L1 of a dual-layer DVD having distant data layers, without defocus adjustments.

On the other hand, a dual-layer DVD having close data layers exhibits a steep decrease in digital jitter to the change in focus balance value. Especially, at a focus balance closer to zero (no defocus adjustments at zero), the digital jitter is very small so that data may not be reproduced.

Therefore, the reproduction of data from the layer L1 of a dual-layer DVD having close data layers requires focus adjustments at an appropriate focus balance value. However, as described above, there is a possibility that an appropriate focus balance value cannot be obtained with ordinary defocus adjustments for a dual-layer DVD having close data layers.

In order to solve the problem discussed above, in an optical disc apparatus, a focus control method, and a control program according to the present invention, a previously stored appropriate focus balance value is used in accessing the layer L1 of a dual-layer DVD having close data layers, as described above. Therefore, the present invention achieves high reproduction quality at the layer L1 of a dual-layer DVD having close data layers.

A focus balance value for the layer L1 in the special mode is obtained with actual measurements. For example, when the solid-line curve shown in FIG. 5 is obtained with actual measurements, a focus balance value (for example, 26) that gives almost a peak jitter is used for reproduction of the layer L1 of a dual-layer DVD having close data layers.

The focus balance value used in the special mode depends on the optical pickup device 70, a micro computer of the controller 61, and other parts of the optical disc apparatus 60. It is therefore preferable to make actual measurements to obtain a focus balance value used in the special mode for each optical disc apparatus 60 if the configuration is modified.

As described above, there is a relationship between an appropriate focus balance value and a FES curve. Therefore, an appropriate focus balance value can be obtained with the determination of disc type according to the first, second, and third requirements described above.

An appropriate focus balance value depends on the characteristics of the optical pickup device 70 and other factors. Therefore, it is preferable to set an appropriate focus balance value for each type of optical disc with actual measurements of recording characteristics, reproduction quality, etc. as discussed with respect to FIG. 5.

In addition, if the optical disc D is determined as a dual-layer DVD having close data layers, a previously set focus drive-signal pattern may be used for focus jump to shift a focal point of a laser beam between the layers L0 and L1.

Figure 6:
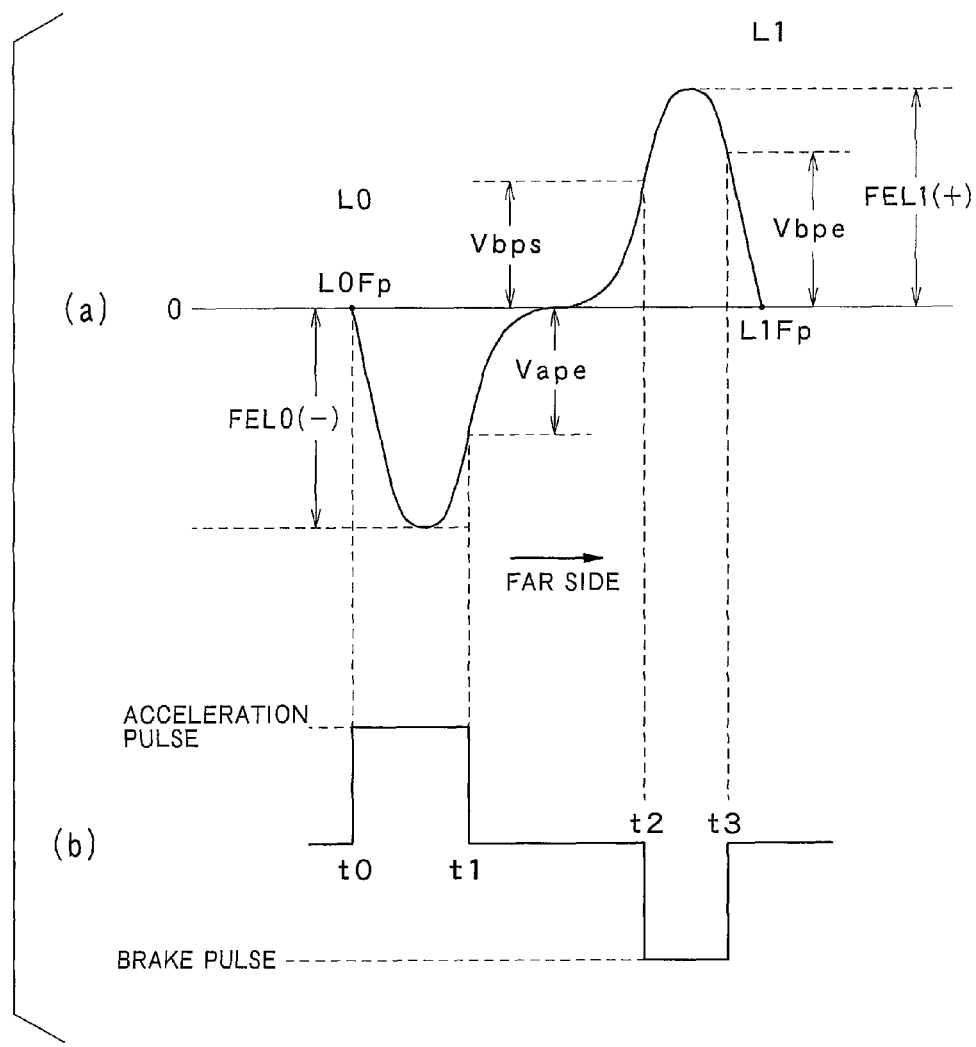
FIG. 6 is view showing time charts of a FE signal in (a) and a focus drive signal in (b) for a dual-layer DVD having distant data layers.

FIG. 6 shows time charts of a FE signal in (a) and a focus drive signal for focus jump from the layer L0 to L1 in (b), for a regular dual-layer DVD having distant data layers.

If focus jump is instructed at a time t0 when a laser beam is located at an in-focal point L0Fp on the layer L0, an acceleration pulse of the focus drive signal is turned on to rapidly shift the in-focal point towards the layer L1 on the far side, with the change in FE-signal level in accordance with a FES curve.

Then, when the FE signal level reaches a predetermined threshold level Vape in the negative side at a time t1, that is lower than the maximum level FEL0(−) in the negative side for the layer L0, the acceleration pulse is turned off so that the movement of the in-focal point is decelerated.

Next, when the FE signal level reaches a predetermined threshold level Vbps in the positive side at a time t2, that is lower than the maximum level FEL1(+) in the positive side for the layer L1, a break pulse of the focus drive signal is turned on to further decelerate the movement of the in-focal point.

Finally, when the FE signal level reaches a predetermined threshold level Vbpe in the positive side at a time t3, that is lower than the maximum level FEL1(+) in the positive side for the layer L1, the break pulse is turned off so that the in-focal point of the laser beam moves to an in-focal point L1Fp on the layer L1 and stops thereat.

However, as discussed with FIG. 4, a dual-layer DVD having close data layers exhibits a low maximum level FEL0(−) in the negative side for the layer L0 or a low maximum level FEL1(+) in the positive side for the layer L1. These levels may be lower than or close to the threshold level Vape, Vbps, or Vbpe shown in (a) of FIG. 6, depending on a dual-layer DVD having close data layers. For such a dual-layer DVD, it could happen that focus jump is not accurately performed due to incorrect performance of turn-off of an acceleration pulse and turn-on and -off of a break pulse of a focus drive signal.

In order to solve the problem discussed above, if the optical disc D is determined as a dual-layer DVD having close data layers, the turn-off of an acceleration pulse and the turn-on and -off of a break pulse of a focus drive signal are performed in accordance with a previously set focus drive-signal pattern having transitions at the times t1, t2, and t3, such as shown in (b) of FIG. 6.

With the focus drive-signal pattern such as shown in (b) of FIG. 6, accurate focus jump is achieved for a dual-layer DVD having close data layers. Moreover, accurate focus jump from the layer L1 to L0 is achieved for a dual-layer DVD having close data layers, with an appropriately set focus drive-signal pattern, such as shown in (b) of FIG. 6.

The times t1, t2, and t3 shown in (b) of FIG. 6 can be adjusted to set a specific focus drive-signal pattern for focus jump at a constant focal-point movement speed.

Moreover, the threshold levels Vape, Vbps, and Vbpe shown in (a) of FIG. 6 used for control of acceleration and brake pulses can be adjusted to set a specific focus drive-signal pattern for focus jump, depending on the optical disc D that is determined as a dual-layer DVD having close or distant data layers.

An appropriate focus drive-signal pattern depends on the characteristics of the optical pickup device 70 and other factors. Therefore, it is preferable to set an appropriate focus drive-signal pattern for each type of optical disc, which can be done with measurements of a FES curve, focus jump by a manual operation, etc.

As described above in detail, in the optical disc apparatus, the focus control method, and the control program according to the present invention, an optical disc is distinguished between a dual-layer DVD having close data layers and that having distant data layers, by using a FES curve.

If the optical disc is determined as a dual-layer DVD having close data layers, a previously set appropriate focus balance value is used for focus control so that high reproduction quality is achieved, with no necessity of a special optical pickup device or other special circuitry, according to the present invention.

Moreover, if the optical disc is determined as a dual-layer DVD having close data layers, accurate focus jump can be performed with an appropriate focus drive-signal pattern, according to the present invention.

The operation and circuit configuration of, and the tracking and focus control by the optical disc apparatus 60 described above are just an example, hence various changes and modifications may be made in the invention without departing from the sprit and scope thereof.

Moreover, a program running on a computer to achieve the function of the controller 61 (and the discriminator 61a when provided separately from the controller 61) is embodied in the present invention. Such a program may be retrieved from a storage medium or transferred over a network and installed in a computer.

As described above in detail, according to the present invention, high reproduction quality is achieved for an optical disc having close data layers, even using a low-priced optical pickup device.

What is claimed is:

1. An optical disc apparatus comprising:
   an optical pickup device configured to detect a value of a return beam reflected by an optical disc and to output the detected value;
   a controller configured to focus control based on the detected value; and
   a discriminator configured, when the optical disc has at least a first data layer and a second data layer on which data is recorded or from which data is reproduced, the first data layer being located closer than the second data layer to a beam-incident surface of the optical disc, to obtain a first positive maximum level in a positive side and a first negative maximum level in a negative side of a characteristic curve of a focus error signal obtained from the optical disc, for the first data layer and a second positive maximum level in the positive side and a second negative maximum level in the negative side of the characteristic curve for the second data layer, to obtain a first focus balance value based on the first positive maximum level and the first negative maximum level for the first data layer and a second focus balance value based on the second positive maximum level and the second negative maximum level for the second data layer, and to determine whether a difference between the first and second focus balance values satisfies at least either a first requirement or a second requirement, the first requirement requiring that the difference exceed a predetermined threshold value and the second requirement requiring that the second focus balance value be smaller than a predetermined threshold value,
   wherein the controller selects a focus balance value depending on a result of the determination concerning the difference between the first and second focus balance values, for focus control.

2. The optical disc apparatus according to claim 1, wherein the discriminator determines whether the difference between the first and second focus balance values satisfies a third requirement requiring that a ratio of the maximum level in the positive side for the first layer to the maximum level in the positive side for the second layer exceed a predetermined threshold value.

3. The optical disc apparatus according to claim 1, wherein the controller selects a focus drive-signal pattern depending on the result of the determination concerning the difference between the first and second focus balance values, for focus jump of an in-focal point between the first and second data layers.

4. The optical disc apparatus according to claim 1 further comprising a memory for storing a specific focus balance value for the second data layer,
   wherein the discriminator discriminates between a regular dual-layer optical disc and a dual-layer optical disc having close data layers, a distance between the close data layers being smaller than the regular dual-layer optical disc and determines that the optical disc is the dual-layer optical disc having close data layers if at least either the first or second requirement is satisfied, and
   the controller selects the specific focus balance value from the memory for focus control if it is determined that the optical disc is the dual-layer optical disc having close data layers.

5. A focus control method for an optical disc having at least a first data layer and a second data layer on which data is recorded or from which data is reproduced, the first data layer being located closer than the second data layer to a beam-incident surface of the optical disc, the method comprising the steps of:
   obtaining a first positive maximum level in a positive side and a first negative maximum level in a negative side of a characteristic curve of a focus error signal obtained from the optical disc, for the first data layer and a second positive maximum level in the positive side and a second negative maximum level in the negative side of the characteristic curve for the second data layer;

obtaining a first focus balance value based on the first positive maximum level and the first negative maximum level for the first data layer and a second focus balance value based on the second positive maximum level and the second negative maximum level for the second data layer;

determining whether a difference between the first and second focus balance values satisfies at least either a first requirement or a second requirement, the first requirement requiring that the difference exceed a predetermined threshold value and the second requirement requiring that the second focus balance value be smaller than a predetermined threshold value; and selecting a focus balance value depending on a result of the determining step, for focus control.

6. The focus control method according to claim 5, wherein it is determined in the determining step whether the difference between the first and second focus balance values satisfies a third requirement requiring that a ratio of the maximum level in the positive side for the first layer to the maximum level in the positive side for the second layer exceed a predetermined threshold value.

7. The focus control method according to claim 5 further comprising the step of selecting a focus drive-signal pattern depending on the result of the determining step, for focus jump of an in-focal point between the first and second data layers.

8. The focus control method according to claim 5 further comprising the steps of:

discriminating between a regular dual-layer optical disc and a dual-layer optical disc having close data layers, a distance between the close data layers being smaller than the regular dual-layer optical disc; and determining that the optical disc is the dual-layer optical disc having close data layers if at least either the first or second requirement is satisfied, wherein a prestored specific focus balance value is selected for focus control if it is determined that the optical disc is the dual-layer optical disc having close data layers.

9. A computer readable storage medium including executable instructions for focus control of an optical disc having at least a first data layer and a second data layer on which data is recorded or from which data is reproduced, the first data layer being located closer than the second data layer to a beam-incident surface of the optical disc, the the computer readable storage medium comprising executable instructions to:

obtain a first positive maximum level in a positive side and a first negative maximum level in a negative side of a characteristic curve of a focus error signal obtained for the optical disc, for the first data layer and a second positive maximum level in the positive side and a second negative maximum level in the negative side of the characteristic curve for the second data layer;

obtain a first focus balance value based on the first positive maximum level and the first negative maximum level for the first data layer and a second focus balance value based on the second positive maximum level and the second negative maximum level for the second data layer;

determine whether a difference between the first and second focus balance values satisfies at least either a first requirement or a second requirement, the first requirement requiring that the difference exceed a predetermined threshold value and the second requirement requiring that the second focus balance value be smaller than a predetermined threshold value; and select a focus balance value depending on a result of the determining step, for focus control.

10. The computer readable storage medium according to claim 9, wherein it is determined by the program code of determination whether the difference between the first and second focus balance values satisfies a third requirement requiring that a ratio of the maximum level in the positive side for the first layer to the maximum level in the positive side for the second layer exceed a predetermined threshold value.

11. The computer readable storage medium according to claim 9 further comprising a program code of selecting a focus drive-signal pattern depending on the result of the determining step, for focus jump of an in-focal point between the first and second data layers.

12. The computer readable storage medium according to claim 9 further comprising:

a program code of discriminating between a regular dual-layer optical disc and a dual-layer optical disc having close data layers, a distance between the close data layers being smaller than the regular dual-layer optical disc; and a program code of determining that the optical disc is the dual-layer optical disc having close data layers if at least either the first or second requirement is satisfied, wherein a prestored specific focus balance value is selected for focus control by the program code of selection if it is determined that the optical disc is the dual-layer optical disc having close data layers.

* * * * *